United States Patent [19]

Muhlethaler

[11] 4,128,943

[45] Dec. 12, 1978

[54] APPARATUS FOR CONTROLLING INNER AND OUTER SURFACES, OF MEMBERS OF MECHANICS, AND UTILIZATION OF THIS APPARATUS

[75] Inventor: Henri Muhlethaler, Chemin Es-Pierres 2, 1422 Les Tuileries de Grandson Canton of Vaud Lucens, Switzerland

[73] Assignee: Henri Muhlethaler S.A., Canton of Vaud, Switzerland

[21] Appl. No.: 786,099

[22] Filed: Apr. 11, 1977

[30] Foreign Application Priority Data

Apr. 13, 1976 [CH] Switzerland ................... 4671/76

[51] Int. Cl.² ........................... G01B 5/20; G01B 5/28
[52] U.S. Cl. ............................ 33/174 Q; 33/147 E; 33/178 R
[58] Field of Search ............ 33/174 Q, 147 K, 147 E, 33/172 D, 178 R, 191, 174 P, 174 TA, 174 TD, 174 S

[56] References Cited

U.S. PATENT DOCUMENTS

| 3,346,964 | 10/1967 | Schiller et al. | 33/147 E |
| 3,609,870 | 10/1971 | Johnson et al. | 33/178 R |

Primary Examiner—Richard E. Aegerter
Assistant Examiner—Willis Little
Attorney, Agent, or Firm—Silverman, Cass & Singer, Ltd.

[57] ABSTRACT

Method and apparatus for gauging inner and outer surfaces of a member, the member mounted on a table with the surface to be gauged oriented perpendicular to the table surface. Three feelers are disposed above the table. The feelers are adjustable radially in their position depending on the geometry of the member. One of the said feelers is spring biased for radial movement and bears against the said surface. This movable feeler is connected to a comparator indicating its position.

The table is inclined so that, by gravity, the member rests with the surface to be gauged on the said three feelers. The table also is movable in a direction perpendicular to its plan, so as to permit movement of the member parallel to the surface to be gauged. Variations of the said surface are indicated by variations of the indications furnished by the comparator during this movement. A sustentation device which is adjustable in relation to the weight of the member acts on the table so that the table and the member therein can be maintained in any axial position.

10 Claims, 7 Drawing Figures

APPARATUS FOR CONTROLLING INNER AND OUTER SURFACES, OF MEMBERS OF MECHANICS, AND UTILIZATION OF THIS APPARATUS

The present invention relates to an apparatus for controlling inner and outer surfaces, of members of mechanics, comprising a table intended to receive the member to be controlled, the surface to be controlled of this member being perpendicular to the plan of the said table, and three feelers situated above this table, radially adjustable in their position in function of the geometry of the member to be controlled, one of the said feelers being movable radially and being submitted to the action of a return spring which urges it against the said surface, this movable feeler being moreover connected to a comparator indicating its position.

The invention has also for object a utilization of the above mentioned apparatus, for controlling cylindrical circular surfaces.

The apparatus according to the invention is characterized by the fact that its table is inclined so that, by gravity, the member rests, by its surface to be controlled, on the said three feelers, the said table being moreover movable in a direction perpendicular to its plan, so as to permit, while moving it along the said direction, to move the member parallely to the surface to be controlled, the possible unprecisions of the said surface being indicated by the variations of the indications furnished by the comparator during this movement, a device of sustentation, the effect of which is adjustable in function of the weight of the member to be controlled, acting on the said table so that the table, together with the said member, be maintained in any axial position in which it is placed.

The use of the said apparatus according to the invention is characterized by the fact that, in any axial position of the table, one rotates thereon the member to be controlled so as to permit to control, by means of the comparator, the circularity of the cylindrical surface.

The drawing shows, by way of example, one embodiment of the object of the invention.

Figure 5:
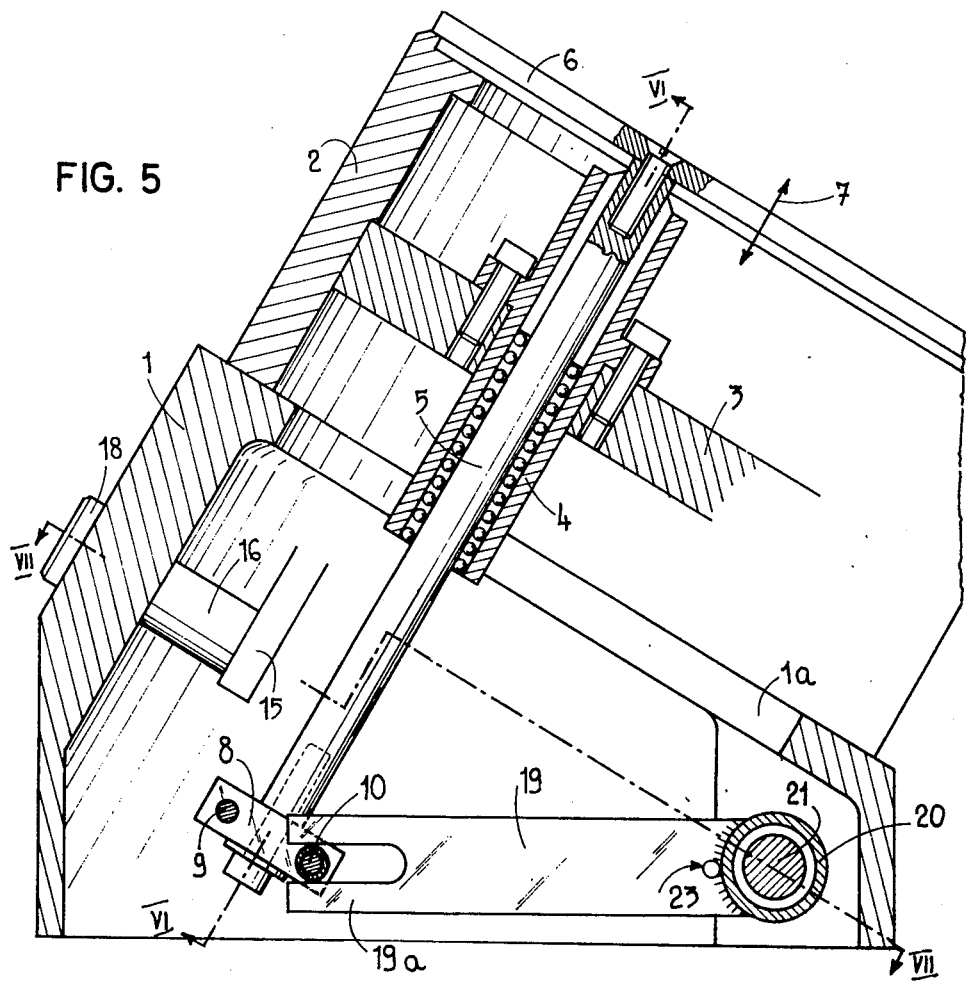
FIG. 5 is a sectional view along line V—V of FIG. 7.
Figure 6:
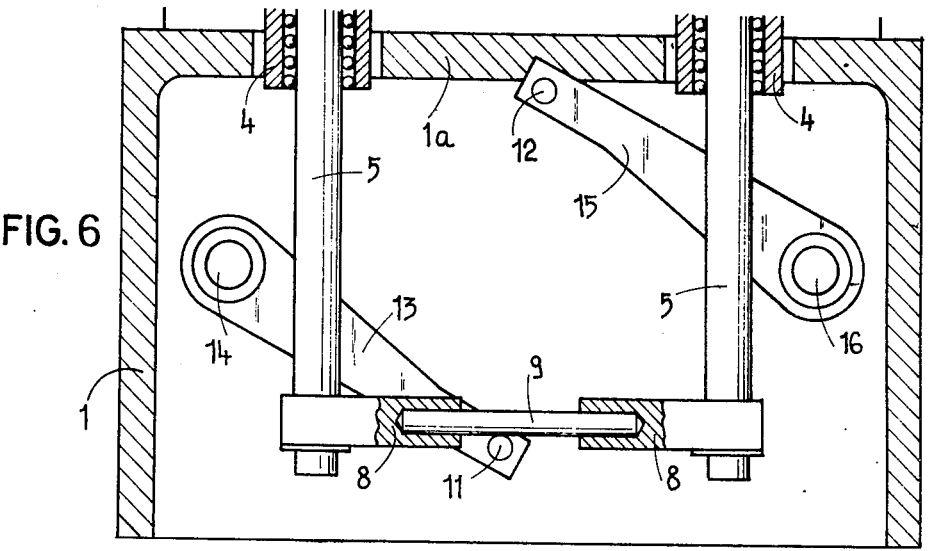
FIG. 6 is a sectional view of a detail, along line VI—VI of FIG. 2 and along line VI—VI of FIG. 5, in which only some elements of the apparatus have been represented.

The apparatus represented comprises a frame 1 having the shape of a socle, on the front inclined face 1a of which is mounted a stationary annular element 2. This annular element 2 carries, inwardly, a transversal plate 3, on which are mounted two ball-bearings 4 in which slide two rods 5. These rods constitute the supporting columns of a circular table 6, the plan of which is inclined with respect to the horizontal line, and which can be moved, owing to the above mentioned arrangement, parallely to itself, in a translation movement along a direction perpendicular to its plan, indicated by the arrow 7 of FIG. 5. The two columns 5 are connected, at their lower end, by a yoke constituted by two small plates 8 connected by two intermediary rods 9 and 10. The rod 9 is intented to abut, during the displacements of the table in the direction of the arrow 7, in one sense or in the other, against one or the other of two abutting pins 11 and 12 carried one by a lever 13 articulated at 14 on the frame 1, and the other by a lever 15 articulated at 16 on the frame. The axes 14 and 16 of these two levers are provided with control heads 17 and 18, respectively, which permit to act on the said axes 14 and 16 for rotating them and thus modifying the position of the levers 13 and 14, respectively, and, consequently, the position of the abutting pins 11 and 12. The amplitude of the stroke of the table 6 as well as its extreme lower and upper positions are, this way, adjustable.

Figure 7:
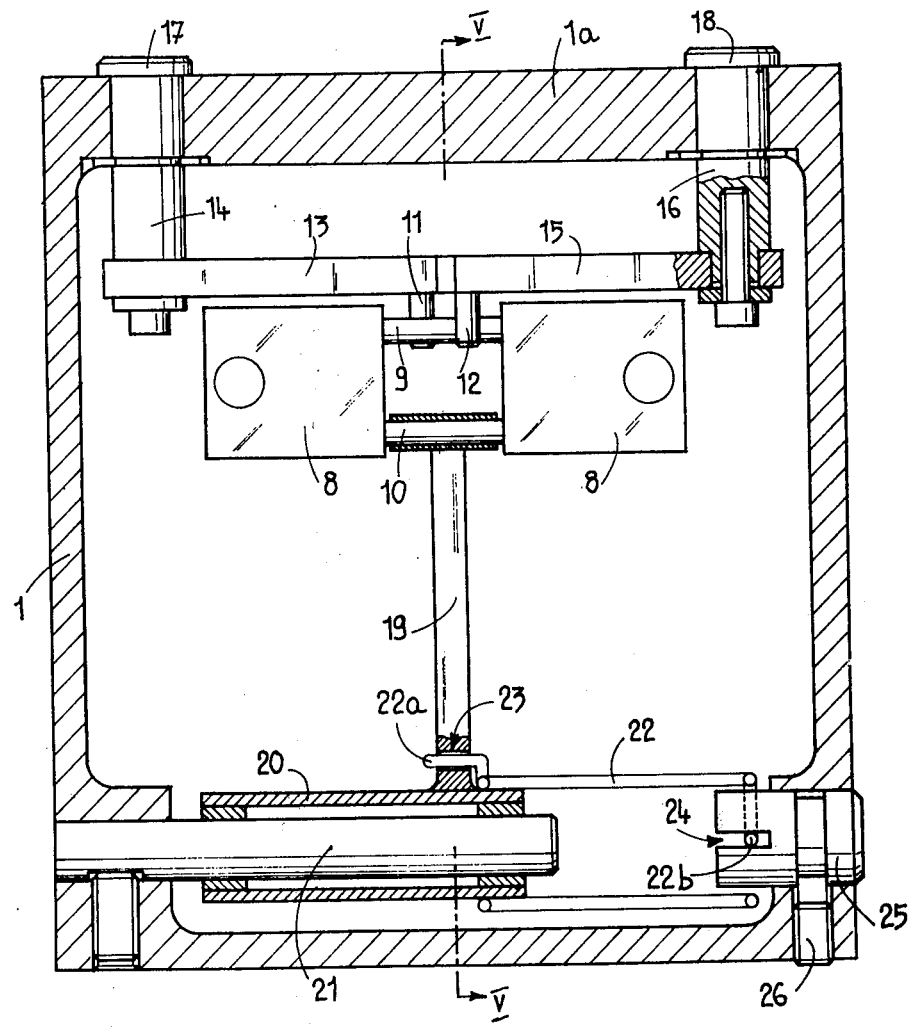
FIG. 7 is a sectional view along line VII—VII of FIG. 5.

So far as the rod 10 of the yoke connecting the columns 5 one to each other is concerned, it receives the fork-shaped end 19a of an oscillating lever 19 secured, at its opposed end, to a sleeve 20 (FIG. 7) rotatably mounted on a stationary shaft 21 carried by the frame 1. The lever 19 is submitted to the action of an helicoidal spring 22, working under torsion, one end 22a of which is engaged in a hole 23 (FIGS. 5 and 7) provided in the said levers, and the other end, 22b, of which is engaged in a diametral slit 24 provided in a cylindrical member 25 rotatably mounted in the frame 1, the rotation of which permits to modify the tension of the spring 22. A locking screw 26 acts on the member 25 for maintaining it in the several angular positions it can occupy on the frame 1, corresponding to the several conditions of tension of the spring 22.

Figure 1:
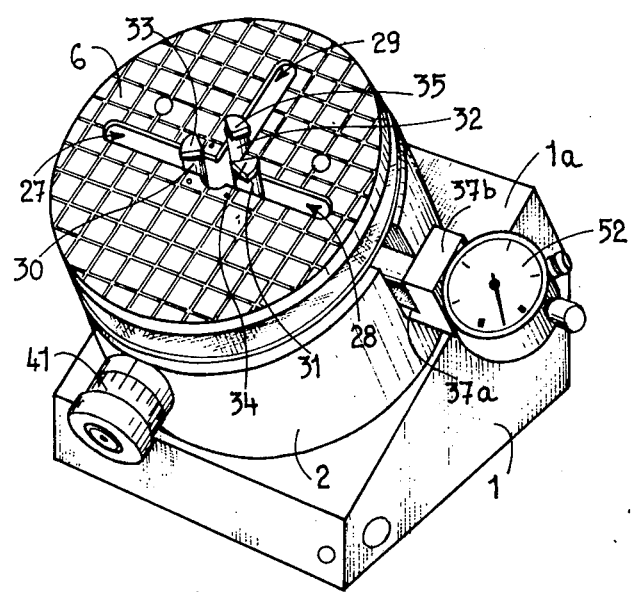
FIG. 1 is a perspective view of an apparatus for controlling inner and outer surfaces of members of mechanics.
Figure 2:
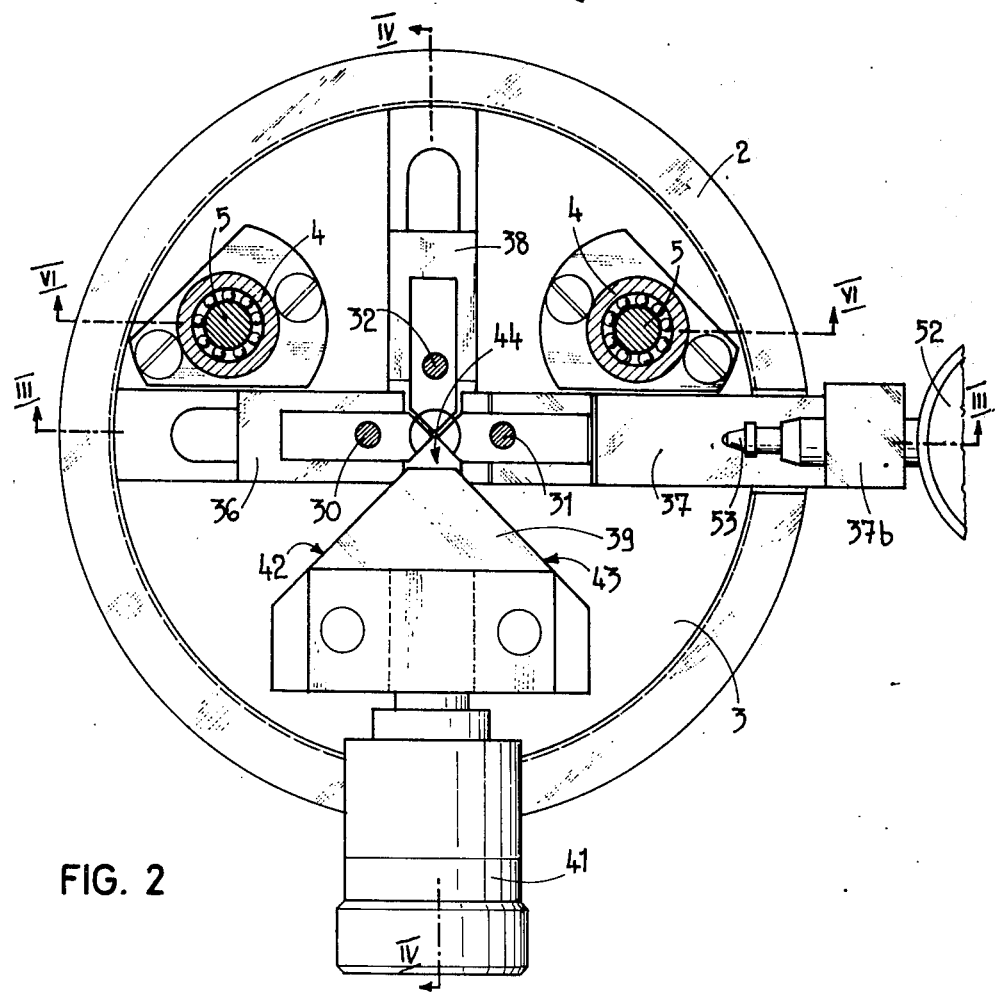
FIG. 2 is a plan view of a part of this apparatus, with partial section, at a larger scale.
Figure 3:
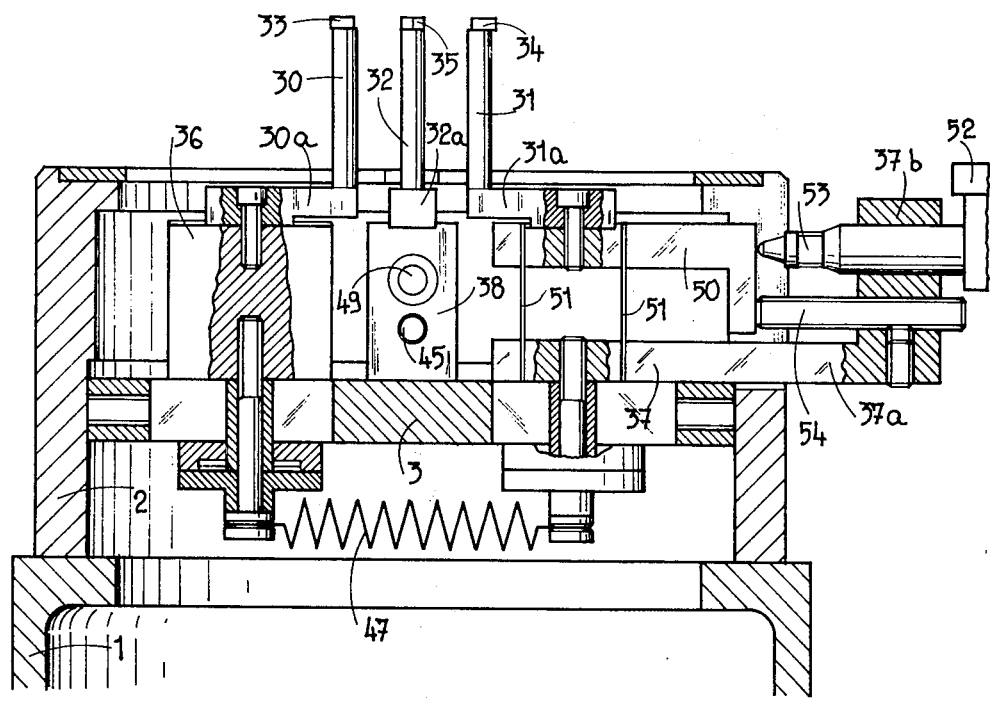
FIG. 3 is a sectional view along line III—III of FIG. 2.
Figure 4:
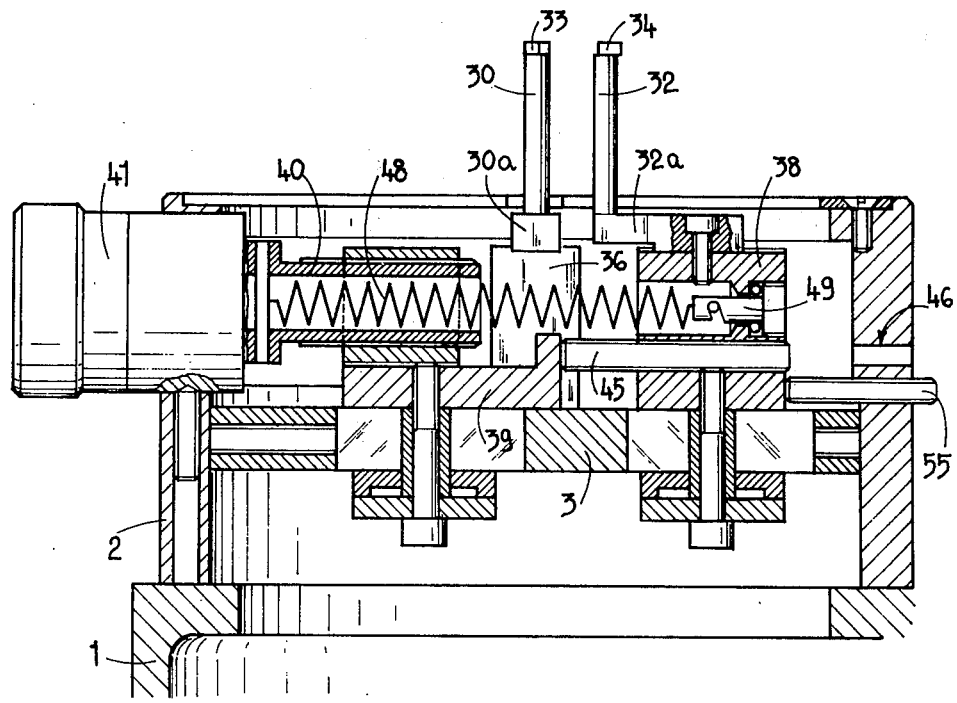
FIG. 4 is a sectional view along line IV—IV of FIG. 2.

The table 6 is provided with three elongated apertures, 27, 28 and 29 (FIG. 1) arranged radially, the two first ones of which are situated on a common diameter of the table and the third one of which is situated on a diameter perpendicular to the first one. These apertures give passage to three rods 30, 31 and 32 carrying each, at their upper end, a member having the shape of a sector of circle, designated respectively by 33, 34 and 35, constituting feelers the surface to be checked. The feeler-carriers 30, 31 and 32 are ended, at their lower end, by a portion having the shape of a heel 30a, 31a and 32a secured to three sliding members 36, 37 and 38, respectively. These sliding members move radially on the intermediary plate 3 (FIGS. 3 and 4) carried by the annular portion 2 of the frame. Their radial position is determined by a wedge-shaped member 39 sliding also radially on the plate 3, in the direction of the displacements of the sliding member 38, and which is controlled by a micrometric screw 40 rigid with a control nut 41. The sliding members 36 and 37 bear on the lateral faces 42 and 43 respectively (FIG. 2), of the wedge-shaped member 39, while the sliding member 38 bears thereon on its terminal face, which is truncated, designated by 44, by the intermediary of a screw 45 (FIG. 4) carried by the said sliding member 38. This screw 45 permits to correct a possible unprecision in the position of the sliding member 38 and, consequently, of the feeler 35, with respect to the two other feelers 33 and 34, so that each of the feelers is exactly at the same distance of the center of the table. A hole 46, provided in the annular member 2 (FIG. 4) permits to reach, by means of a screw driver, the screw 45. A coil-spring 47 (FIG. 3), hooked to the two sliding members 36 and 37, maintains them applied against the surfaces 42 and 43, respectively, of the wedge-shaped member 39, while a coil-spring 48 (FIG. 4) partially engaged in a blind hole of the micrometric screw 40, and which is hooked on the one hand to this latter and on the other hand, at 49, to the sliding member 38, maintains this latter applied, by the intermediary of the screw 45, on the surface 44 of the wedge-shaped member 39.

The feeler-carrier 31 is not mounted directly on the sliding member 37 but is secured to a square-shaped member 50 (FIG. 3) which is itself supported by the sliding member 37 by the intermediary of two elastic blades 51, that permits to the whole constituted by the feeler 34, the feeler-carrier 31 and the square-shaped member 50 to move slightly, parallely to itself in a translation movement with respect to the sliding member 37. This member is prolongated by an arm 37a provided with a shoulder 37b on which is secured a comparator 52 the feeler of which, designated by 53 (FIGS. 2 and 3), is bearing against the end of the square-shaped member 50.

The apparatus as disclosed and represented operates as follows:

In the case where the surface of the member to be controlled is a circular inner cylindrical surface, for instance, the control nut 41 of the wedge-shaped member 39 is operated until the three feelers occupy a position in which they are inscribed in a circle slightly greater than the diameter of the inner surface to be controlled. It is to be noted that an abutting screw 54 (FIG. 3), carried by the shoulder 37b of the sliding member 37, permits to act on the elbow of the square-shaped member 50 for adjusting the position of the movable feeler 34 so that this latter has not to be too much radially moved inwardly during the engagement of the mmber to be controlled on the three feelers, that facilitates this engagement.

Owing to the fact that the plan of the table is inclined with respect to the horizontal line, the member to be controlled bears, by gravity, on the three feelers 33, 34 and 35 as well as it bears, axially, on the table. While acting on the adjusting member 25, by means of a screw driver for instance, one adjusts the tension of the return spring 22 of the table so that the weight of this table and of the member to be controlled it carries be balanced by the antagonist force exerted by the spring.

One adjusts also the position of the abutting pins 11 and 12 so that the stroke of the table corresponds to the length of the circular inner cylindrical surface to be controlled, and that the position of the said stroke in height corresponds to the position, in height, above the level of the table, of the surface to be controlled.

It is then sufficient to rotate the member on the table, this table occupying a determined axial position in which it maintains from itself under the effect of sustentation produced by the spring 22 through the intermediary of the lever 19, the oscillating movements of which follow the displacements of the table, for checking, by means of the comparator 51, the circularity of the cylindrical surface at a given level of this latter. While moving the table in the direction of the arrow 7 of FIG. 5, one checks if the diameter of the surface to be controlled is exact on the whole length thereof, new rotations of the member being able to be effected, in view of checking the circularity of the surface, in any point of the height of this latter.

When the surface to be controlled is an outer surface, it will be necessary to modify the position of the feelers 33, 34 and 35 on the feeler-carriers 30, 31 and 32, respectively, so that the said feelers go beyond inwardly the feeler-carriers and not outwardly as in the case represented in the drawing. Moreover, it will be necessary to place under the frame 1 an inclined socle, not represented in the drawing, having for effect that the inclination of the table with respect to the horizontal line be the reverse of this one represented, the table rocking at 90°, for permitting to engage the member, by its cylindrical surface to be controlled, between the feelers and not around these latters. So that, however, the weight of the table does not urge the feelers outwardly, while separating the sliding members 36, 37 and 38 from the wedge-shaped member 39, against the action of the return springs 47 and 48, the apparatus comprises locking screws 55 (FIG. 4), carried by the annular member 2, permitting, when the position of the feelers has been determined by means of the control nut 41, to lock the sliding members in their position, that is to say applied against the wedge-shaped member 39.

It is to be noted that the present apparatus permits not only to control circular cylindrical surfaces, but also to control non-circular cylindrical surfaces, for instance elliptic surfaces, as well as to control surfaces which would not be surfaces of revolution, in the case, for instance, of members of inner or outer square section or of any other shape.

What I claim is:

1. Apparatus for controlling inner and outer surfaces of mechanical members comprising a planar table intended to receive the member to be controlled, the surface to be controlled of this member being perpendicular to the upper surface of the said table, at least three interconnecting elongated apertures provided in said table, three feelers extending through said apertures and projecting above said table, said feelers being radially adjustable in their position in function of the geometry of the member to be controlled, a return spring connected to one of the said feelers for urging said one of said feelers against the said surface, a comparator further connected to said one of said feelers for indicating its position, characterized by the fact that the said table is inclined so that, by gravity, the member rests, by its surface to be controlled, on the said three feelers, the said table moreover movable in a direction perpendicular to its upper surface, so as to permit, while moving it along the said direction, to move the member parallel to the surface to be controlled, the possible discrepancies of the said surface being indicated by the variations of the indications furnished by the comparator during this movement, a device of sustentation, the effect of which is adjustable in function of the weight of the member to be controlled, acting on the said table so that the table, together with the said member, be maintained in any axial position in which it is placed.

2. Apparatus as claimed in claim 1, characterized by the fact that the sustentation device of the table comprises a lever, articulated on the frame of the apparatus, the end of which is connected to the table so as the displacements of the table produce the oscillating movements of the said lever, this latter being submitted to the action of a return spring, the tension of which is adjustable, ensuring the sustentation of the table and of the member it carries.

3. Apparatus as claimed in claim 2, characterized by the fact that the said spring is a torsion spring acting on the said lever.

4. Apparatus as claimed in claim 1, characterized by the fact that it comprises adjustable abutting members limitating, in its two directions, the stroke of the table.

5. Apparatus as claimed in claim 1, characterized by the fact that two of the said feelers, including this one which is movable, are arranged opposite to each other on a same axis of the table, on both sides of the center of the table, the third feeler being situated on an axis of the table perpendicular to the first axis.

6. Apparatus as claimed in claim 5, characterized by the fact that it comprises a wedge-shaped member, movable by means of an adjusting screw along the axis on which is situated the third feeler, each of the feelers being adjustable in their position along the axis on which it is situated, under the effect of the wedge-shaped member which acts, by its apex, on the support of the said third feeler and, by its two faces adjacent to the said apex, on the supports of the two feelers, elastic means applying the supports of the said feelers against the said wedge-shaped member the position of which determines thus the position of the said feelers.

7. Apparatus as claimed in claim 6, characterized by the fact that it comprises locking means of the position of the support of the three feelers maintaining these supports applied against the wedge-shaped member when the surface of the member to be controlled is an outer surface and that, consequently, the pressure of the said member on the feelers urges to increase the distance between the supports of the feelers and the wedge-shaped member.

8. Apparatus as claimed in claim 6, characterized by the fact that the movable feeler is mounted on its support by means of two elastic blades sustaining it, that permits to the said feeler to move in a movement of translation while being resiliently returned into its position.

9. Apparatus as claimed in claim 8, characterized by the fact that the movable feeler is submitted to the action of an adjusting screw permitting to modify its position independently from the two other feelers, so as to permit to place it into a position such that, in the case where the surface of the member to be controlled is an inner surface, the said member can be engaged easily on the three feelers, while producing only a slight displacement of the movable feeler.

10. A method for gauging the inner and/or outer generally cylindrical surfaces of mechanical members comprising, providing an inclined planar table having at least a pair of preset feelers and a third variable feeler, the variable feeler coupled with an indicator placing the member upon the planar table so that the surface to be gauged rests on said feelers and in particular on the variable feeler, selectively raising or lowering the table axially to raise or lower the member relative to said feelers, positioning the table at selectively different axial dispositions relative to said feelers while rotating the table with the member simultaneously about the feelers, monitoring the discrepancies with the comparator.

* * * * *